Nov. 25, 1930.  J. C. McCUNE  1,782,578

FOOT VALVE DEVICE

Filed Feb. 11, 1929

INVENTOR
JOSEPH C. McCUNE
BY *Wm. M. Cady*
ATTORNEY

Patented Nov. 25, 1930

1,782,578

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FOOT-VALVE DEVICE

Application filed February 11, 1929. Serial No. 339,054.

This invention relates to the type of equipment known as a safety car control equipment, and more particularly to the so called foot valve device employed in such an equipment.

The principal object of my invention is to provide an improved foot valve device for a safety car control equipment.

Figure 1:
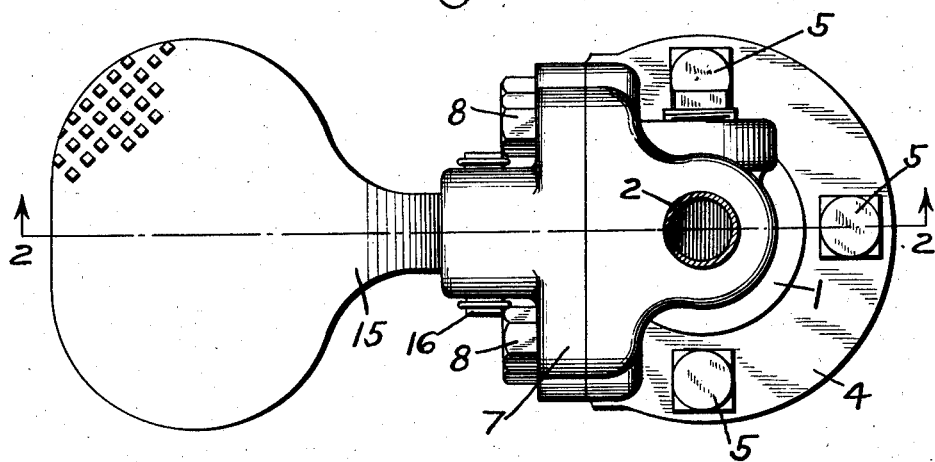
Figure 2:
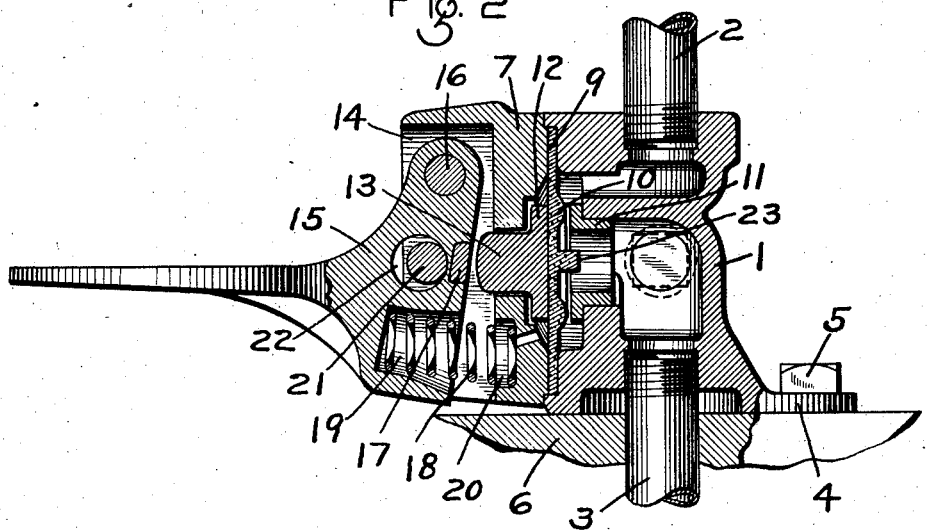

In the accompanying drawing: Figure 1 is a plan view of a foot valve device embodying my invention; and Fig. 2 a section on the line 2—2 of Fig. 1.

In a safety car control equipment, when the controller handle is released, fluid under pressure is vented from a safety control pipe and when fluid is vented from said pipe, means are operated to effect an emergency application of the brakes.

If the motorman wishes to release the controller handle, without causing an emergency application of the brakes, he may do so by depressing the pedal of the foot valve device, which operates to cut off communication through the safety control pipe, so that fluid under pressure will not be vented from the safety control pipe, when the controller handle is released. An equipment of the above character is shown in my Patent No. 1,703,892, issued March 5, 1929.

The foot valve device shown in the drawing comprises a casing 1 connected to a safety control pipe, the section 2 of the safety control pipe leading to the safety controller handle device (not shown) and the section 3 to the devices which are operated by a reduction in control pipe pressure to effect an emergency application of the brakes.

The casing 1 is provided with a flange 4 having bolt holes for receiving bolts 5 by which the casing is secured to the car floor 6. A pedal carrying member 7 is clamped to a face of the casing 1 by bolts 8 and interposed between said member and the casing is a flexible diaphragm 9.

The diaphragm 9 is provided with an annular seat rib 10, which is adapted to seat on a seat bushing 11 secured in a bore of the casing 1. Engaging the opposite side of the diaphragm is the flange 12 carried by a stem 13 and said stem extends through an opening in the member 7.

Mounted in a cavity 14 formed in the member 7 is a pedal member 15, the pedal member being pivotally supported by a pin 16 secured in said member and the pedal member is provided on its inner face with a wear insert 17 adapted to engage the outer end of the stem 13. A coil spring 18 is interposed between the pedal member 15 and the member 7, the pedal member being provided with a cavity 19 to receive one end of the spring and the member 7 with a cavity 20 adapted to receive the other end of the spring.

A pin 21, secured in the member 7, extends through an opening 22 in the pedal member and the opening 22 is of greater diameter than the pin 21 so as to permit of a limited movement of the pedal member. The spring 18 may be under initial compression, so that the pedal member will normally be held in the position shown in the drawing. The wall of the opening 22 being pressed against the pin 21 by the spring 18, the pedal member is prevented from rattling when not in use.

The diaphragm 9 may be provided with a teat 23, which serves to prevent installation of the diaphragm in the reverse direction.

When the operator wishes to prevent an emergency application of the brakes upon release of the controller handle, he depresses the pedal member 15 with his foot and thereby the diaphragm 9 is moved by the movement of stem 13, so that the rib 10 engages the seat bushing 11 and thus communication through the safety control pipe is cut off.

A compact foot valve construction is thus provided and the spring 18 being housed within the member 7, is protected against damage and breakage, due to rusting by exposure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A foot valve device for a safety car control equipment having a control pipe comprising a casing interposed between sections of said pipe, a member having a cavity, a diaphragm valve mounted between said member and casing for controlling communication through said pipe, and a pedal member pivotally mounted in said cavity for operating said valve.

2. A foot valve device for a safety car control equipment having a control pipe comprising a casing interposed between sections of said pipe, a member having a cavity, a diaphragm valve mounted between said member and casing for controlling communication through said pipe, a pedal pivotally mounted in said cavity for operating said valve, and a spring disposed in said cavity and interposed between said pedal and said member for moving said pedal in one direction.

3. A foot valve device for a safety car control equipment having a control pipe comprising a casing interposed between sections of said pipe, a member having a cavity, a diaphragm valve mounted between said member and casing for controlling communication through said pipe, a stem engaging said valve, a pedal pivotally mounted in said cavity for operating said stem, and a spring disposed in said cavity and interposed between said pedal and said member for urging said pedal away from said stem.

4. A foot valve device for a safety car control equipment having a control pipe comprising a casing interposed between sections of said pipe, a member having a cavity, a diaphragm valve mounted between said member and casing for controlling communication through said pipe, a stem engaging said valve, a pedal pivotally mounted in said cavity for operating said stem, a spring disposed in said cavity for urging said pedal away from said stem, and a pin carried by said member and extending through an opening in said pedal for limiting the movement of said pedal away from said stem.

In testimony whereof I have hereunto set my hand, this 8th day of February, 1929.

JOSEPH C. McCUNE.